United States Patent [19]

Davies et al.

[11] E Re. 29,986

[45] Reissued May 8, 1979

[54] ELECTRICAL CONTACT MATERIAL AND PROCESS

[75] Inventors: Terrence A. Davies, Encino, Calif.; David J. Pedder, Oxford, England

[73] Assignee: Square D Company, Park Ridge, Ill.

[21] Appl. No.: 863,543

[22] Filed: Dec. 23, 1977

Related U.S. Patent Documents

Reissue of:

[64] Patent No.: 4,011,052
Issued: Mar. 8, 1977
Appl. No.: 620,909
Filed: Oct. 8, 1975

U.S. Applications:

[63] Continuation-in-part of Ser. No. 387,884, Aug. 13, 1973, abandoned, and a continuation-in-part of Ser. No. 340,440, Mar. 12, 1973, abandoned.

[30] Foreign Application Priority Data

Mar. 15, 1972 [GB] United Kingdom ..... 12189/72
Aug. 18, 1972 [GB] United Kingdom ..... 38568/72
Aug. 25, 1972 [GB] United Kingdom ..... 39667/72

[51] Int. Cl.[2] ..... B22F 3/00; H01H 1/02

[52] U.S. Cl. ..... 75/234; 75/211; 75/235; 200/265; 200/270

[58] Field of Search ..... 200/266, 265, 270; 75/235, 234, 206, 211; 148/126

[56] References Cited

U.S. PATENT DOCUMENTS

| | | | |
|---|---|---|---|
| 2,396,101 | 3/1946 | Hensel et al. | 29/182.5 |
| 2,770,700 | 11/1956 | Holm et al. | 200/266 |
| 2,890,315 | 6/1959 | Graves | 200/266 |
| 3,472,654 | 10/1969 | Comey et al. | 200/266 |
| 3,501,287 | 3/1970 | Lever | 75/0.5 |
| 3,540,883 | 11/1970 | Comey et al. | 75/173 |
| 3,701,654 | 10/1972 | Santala et al. | 75/173 |

OTHER PUBLICATIONS

Shen et al., The Effect of Additives From Group 1A & 11A on Morphology & Properties of Silver–Cadmium Oxide Contacts, 1971, Seventeenth Annual Holm Seminar.

Broadwarow, Proceedings 5th International Conference on Electrical Contact Phenomena, Munich, May 1970.

*Primary Examiner*—Brooks H. Hunt

*Attorney, Agent, or Firm*—Richard T. Guttman; William H. Schmeling

[57] ABSTRACT

A material for use in making electrical contacts is produced in a powder form suitable for later processing into electrical contacts by standard metallurgical techniques. The material consists of a first metal, such as silver, and the oxide of a second metal, such as cadmium, added to the first metal in a proportion up to the limits of solubility of the second metal in the first metal. An oxide of a third metal having a low electronic work function level, such as lithium oxide, is added and uniformly distributed on the surfaces of the powder particles by precipitation. A fourth metal, such as tellurium, that is insoluble in the first metal is also added to provide selected characteristics.

58 Claims, No Drawings

ELECTRICAL CONTACT MATERIAL AND PROCESS

Matter enclosed in heavy brackets [ ] appears in the original patent but forms no part of this reissue specification; matter printed in italics indicates the additions made by reissue.

The present application is a continuation-in-part of Improvements in or Relating to Electrical Contact Materials, Ser. No. 340,440 filed Mar. 12, 1973 now abandoned, and and a continuation-in-part of Electrical Contact Materials and Method of Producing Them, Ser. No. 387,884 filed Aug. 13, 1973 now abandoned, *which have priority of United Kingdom applications Ser. No. 12189 filed March 15, 1972, Ser. No. 38568 filed August 18, 1972 and Ser. No. 39667 filed August 25, 1972,* for purposes of obtaining the benefit of the filing dates in accordance with the provisions of *35 U.S.C. 119 and* 35 U.S.C. 120.

This invention relates to materials for making electrical contacts for use in medium and low power electrical equipment and to processes for making the materials.

With this invention a material usable for making electrical contacts is produced that results in contacts that have desirable welding resistance, arc-extinguishing characteristics, arc-erosion resistance and relatively low contact resistance and that are relatively inexpensive and simple to produce. The material is made of a mixture of a first metal and a second metal that is added to the first metal to alloy with the first metal in an amount up to the limits of solubility of the second metal in the first metal. The material may be made in any known way but is preferably made by utilizing powders of the first and second metals and producing the alloy in a powder form. The first metal is selected primarily for its current carrying characteristics and the second metal is selected for the characteristics it imparts to the finished contact but when used in a process according to this invention it must also be more readily oxidizable than the first metal. The alloy of the first and second metal is subjected to an oxidation process that internally oxidizes the second metal.

In practice it appears that the preferred metals are silver for the first metal and cadmium for the second metal. However, there is substantiation, theoretical and empirical, that other metals could be used, particularly copper for the first metal and zinc or tin for the second metal. Since the limits of solubility of the second metals in the first metals varies the maximum proportion of second metal to first metal varies depending on the metals used. With silver and cadmium, a desirable proportion of cadmium known in the prior art is about 13% of cadmium by weight in the total material mixture. However, even a small amount of cadmium produces some desirable characteristics and the maximum proportion could be desirable for some applications. For example, cadmium theoretically can be dissolved up to about 40% by weight cadmium with 60% by weight silver at room temperature and up to about 44% by weight cadmium at 400° C. If considered desirable it is possible that the maximum amount of cadmium soluble at a higher temperature, e.g., 44% by weight at 400° C., could be achieved at lower temperatures by cooling the alloy and maintaining the metastable condition.

In order to obtain internal oxidation of the second metal during typical processing without affecting the first metal it also is necessary that the second metal oxidize more readily than the first metal under the processing conditions to be encountered. This condition exists for silver or copper as a first metal and cadmium, zinc or tin as a second metal.

A third metal oxide, or material, having a low electronic work function, such as an alkali or alkaline metal, e.g., lithium oxide, is added by precipitation or similar procedures that produce uniform distribution of the third metal oxide on the surface. The third metal is added in relatively small amounts up to perhaps one percent by weight, but even perhaps as high as three percent which may be sometimes satisfactory for producing desired results in some metal combinations. If the contact material is in powder form, the third metal oxide may be precipitated on the surfaces of the powder particles.

Lithium oxide and barium oxide have been found to be good low work function materials for this purpose with lithium oxide apparently being preferable in a silver-cadmium oxide contact, but the oxides of the other alkali or alkaline metals seem to be suitable. These metals include those in groups IA of a periodic table, excluding hydrogen, which consists of lithium, sodium, potassium, rubidium, cesium and francium, and those in group IIA which consists of beryllium, magnesium, calcium, strontium, barium and radium would probably not be used but there is no reason to expect that theoretically their effect would not be the same.

The effect of the addition and uniform distribution of the low work function metal or material on the final electrical contact appears to be that it causes a reduction of the electronic work function of the contact at uniformly distributed discrete sites within the contact that it lowers the current density of the arcs formed, and that it apparently reduces electron energy in the arcs formed which reduces the amount of material destroyed by each arc. The theory that appears to explain the performance of the improved contact material is based upon the distribution of the destruction of contact material in relation to the location of the particles of the low work function material. For example, when a contact consists of substances of similar electronic work functions, erosion is caused by the discharges from contact operation that occur between those points that protrude most out of the contact surfaces. As the contact operates and the discharge is initiated, electrons are emitted from these protrusions and the electric field in the vicinity of the protrusions is distorted and increased to a level that significantly increases the emission of electrons. This creates a particular and probable path for the arc discharge. Since each discharge arc damages and roughens the contact surfaces in the region where it occurs, thereby producing high protrusions in that region, it increases the probability that subsequent discharge arcs will occur in the same region thereby causing excessive erosion or excessive contact material transfer in the same, limited areas.

If the low electronic work function material is distributed evenly throughout the contact surface in accordance with this invention the erosion is significantly reduced apparently because it is evenly distributed. The apparent explanation is that the evenly distributed low electronic work function material provides an alternate mechanism for initiating arc discharge since electrons are emitted far more easily, i.e., at low electric field strength, by the lower electronic work function material than by the other, higher work function, materials. The sites of the low electronic work function material in the contact act in generally the same manner with regard to electron emission as do the protrusions in the usual contact. The highest protrusion that contains low work function material provides the electrons that initiate the arc discharge and the resulting discharge destroys the original shape of the protrusion and roughens the area surrounding it at a reduced level because of the reduced current density. The discharge removes the low electronic work function material from the region and, therefore, the next discharge is more likely to be initiated from the highest protrusion that contains low work function materials and so on. Hence, since the low work function material is well distributed throughout the contact, the erosion is well spread over the contact surfaces.

Other explanations of the mechanism by which the contact performs as desired are possible. However, from tests conducted this appears to be an accurate explanation. Accordingly, all low electronic work function materials should work well and those tested seem to verify this. Testing was done with lithium oxide and barium oxide with desirable results. In addition, the effect of low work function materials that exist as trace elements in the material appears to be cumulative with the low work function materials added.

The point in the process at which the third metal oxide should be added depends on the process used. Since the alkali and alkaline metals all are more readily oxidizable than any of the apparent suitable first and second metals, it is possible to add the third metal oxide during any step in the powder process specifically described. Thus the third metal oxide can be added in the early steps of mixing or at any later time, but it has been found preferably to add it after internally oxidizing the second metal. This is accomplished by mixing a solution of a third metal compound in a suitable solvent with the alloy powder material. The resulting mixture is then subjected to a treatment that evaporates the solvent and precipitates the third metal compound onto the alloy powder material and that reduces the metal compound into the oxide of the third metal.

It has also been found that the addition of a fourth metal that is insoluble in the first metal and provides, embrittling qualities such as tellurium, is desirable for many applications. The apparent effect is to increase embrittlement, i.e., welding resistance, by a controllable amount beyond that produced by the addition of the second metal and therefore in many applications produce additionally desirable results.

While there are several known processes by which a suitable contact material according to this invention can be produced it has been found that a powder process according to this invention produces highly desirable results. This process will be described particularly considering silver as the first metal, cadmium as the second metal, lithium oxide as the third metal oxide, and tellurium as the fourth metal. However, other known techniques and processes for manufacturing the contact material and other metals can be used with varying but still improved results.

Preferably, the material is produced by an alloy of a first metal having desired characteristics, such as good electrical conductivity, and a second metal having desired characteristics, such as producing good weld embrittlement, wherein the second metal is selected to oxidize more readily than the first metal under similar environmental conditions. The second metal is heated to alloy with the first metal by adding the second metal in a proportional amount from a minimum effective amount up to a maximum amount determined by the limits of solubility of the second metal in the first metal. The alloy is then heated under conditions that internally oxidize the second metal but do not affect the first metal. With the powder process the alloying and oxidizing temperatures are kept below the melting temperature of the alloy so as to prevent the forming of a melt and retain the powder form. This produces an alloy material, or powdered alloy material, that contains the first metal and the oxide of the second metal with the oxide of the second metal distributed evenly through the contact material.

In its broadest application the powder process uses as starting materials a first starting material of a first metal in a substantially pure, uncombined form or the first metal in a compound or combination form; e.g., silver, silver oxide or silver choride, that is reducible to the first metal by the process; and a second starting material of a second metal in a substantially pure, uncombined form or the second metal in a compound or combination form, e.g., cadmium or cadmium oxide, that is reducible to the second metal by the process. Thus the starting materials may be the first metal and a compound of the second metal, a compound of the first metal and the second metal, a compound of each of the two metals, or the two metals. At this point, if desired and if applicable because of the combinations of the first and second metals used, or for other known reasons, the third metal oxide may be added as one of the starting materials and is then treated throughout the process with the other materials in the manner described. The selected starting materials are mixed in any known manner as suitably adjusted for the type of powders involved as known in the art. The resulting mixture is preferably sieved to particle or aggregate size of a maximum of about 40 microns.

If either of the starting materials is a compound, the sieved mixture is heated in a highly reducing atmosphere, such as hydrogen, which reduces the compounds to their metal states and results in an alloy of the two metals. If the starting materials are the first metal and the second metal in an uncombined state, the sieved mixture is heated in a mildly reducing atmosphere primarily to prevent oxidation. In either case the temperature is held below the melting temperature of the resulting alloy to retain the powder form.

Considering the uncombined first and second metals as starting materials, particularly silver and cadmium, silver in powder form may be obtained by several known methods or from normal commercial supply sources. For example, a silver powder produced by Sheffield Smelting Company, subsidiary of Engelhard Industries, under the trade name "Thessco" is suitable. The starting silver is broken up and sieved as necessary to produce particle sizes not greater than about forty microns. This may be done by sieving through a 350 mesh, British Standard, screen which produces particles no larger than 40 microns and with a typical average size of about 20 microns.

Cadmium in a powder form may be obtained by commercial purchase or it may be produced by a reduction of compounds of cadmium through known chemical or other treating processes. When cadmium is used it is preferably of a size not greater than about one micron but may be of a size up to generally no greater than the silver powder.

The powder of silver and cadmium are then mixed together in a selected proportion. Depending on the characteristics of the contact desired the proportion would vary but typically would be in the range of 13% by weight of cadmium in the final mixture of the silver and cadmium oxide material. For 20% by weight cadmium in the material of silver and cadmium oxide, the amount of cadmium added to silver would be 15.3% of the weight of the silver. However, the amount of cadmium added may be any amount above the trace level, i.e., an effective level, up to the limits of solubility of cadmium in silver. The third metal oxide may be added at this point if appropriate. The mixing is accomplished by any known method and is not very critical since the efficiency of the process later compensates for some incomplete mixing that may occur.

After the silver and cadmium powders are mixed, they are heated at a temperature below the melting temperature of the alloy that would be produced by the proportional mixture of silver and cadmium present. The heating is done in any known mildly reducing atmosphere, such as 97% nitrogen and 3% hydrogen, to prevent any oxidation of the cadmium. The upper temperature limitation assures that the alloy produced is in a powder form resulting from the cadmium dissolving into the silver particles. At temperatures above 321° C. the cadmium becomes liquid and homogenization of the alloy involves liquid phase mechanisms while below that temperature homogenization involves solid state diffusion processes as known in the art. Some sintering of the particles may occur but it is limited and it should in any case be avoided to the extent possible by known techniques. Any sintering that does occur is generally loose and easily broken by sieving.

With starting materials of other than first and second metal in uncombined forms, a preferred combination is silver and cadmium oxide, both of which are readily obtainable commercially. With silver and cadmium oxide powder as starting materials, it may be that the mixing must be somewhat more thorough than when starting with the first and second metal in uncombined form. To insure good results the mixing is preferably accomplished by dry tumble milling using dry particles. The volume mixed should be at least 50 grams and the volume of the drum should be about 2 to 10 times the volume of the powder being mixed. The relative humidity inside the drum should be kept below 70% and drum temperature should be about 10° to 30° C. The powders should be continually in motion and the speed of rotation can be increased to reduce the time required up to a speed that results in the over production of aggregates or that, because of centrifical action on the different weight particles, actually hinders mixing. The resulting mixture is sieved.

The sieved material is heated at a temperature of about 400° C. in a highly reducing atmosphere, such as hydrogen, to reduce and alloy the metals. This temperature avoids excessive sintering, minimizes the loss of cadmium and environmental contamination because of volatilization, is well below the melting temperature of the resulting alloy, and is maintained for about an hour with the mixed powders being brought to the temperature at a rate of about 200° C. per hour.

Whichever combination of starting materials is used, the result after this heating step, which is either in alloying or a reducing and alloying step, is an alloy powder. This alloy powder is sieved through a screen of about 30 microns.

The sieved material is heated in a suitable oxidizing atmosphere, such as air or oxygen, at a convenient pressure to substantially completely, i.e., internally, oxidize the second metal. For silver and cadmium, a temperature of between 350° C. and the melting point of the resulting alloy should be maintained with a preferred temperature of about 600° C. The time required depends on the partial pressure of the oxygen, the cadmium content, the temperature, and the size of the powder particles. These factors can be ascertained in a known manner to insure that internal oxidation occurs.

After obtaining the oxidized cadmium and silver alloy, or psuedo alloy, the alloy powder is broken up and sieved to produce a powder for the addition of the third metal oxide if it has not already been added.

The third metal oxide is preferably added at this point and while a preferred third metal oxide is lithium oxide, under some conditions it apparently could be any of the metals within the alkali and alkaline group. Variations in the process if other materials are used are made as necessary in any manner known in the art. A selected amount of lithium usually in the neighborhood of one weight percent, although it is conceivable that under certain conditions the percentage may go as high as 3 weight %, is added to the powder mixture in the form of a compound solution. The compound used may be any suitable compound such as lithium nitrate, lithium carbonate, lithium iodine, lithium hyroxide or any other suitable compound that is dissolvable in a suitable solvent and reducible to an oxide. With lithium nitrate a good solvent is propanol and the solution is mixed with the alloy powder to form a slurry. The strength of the solution is selected so that with approximately equal volumes of liquid and powder the slurry is in a desired consistency and has the desired proportion of lithium to alloy powder. After the solution is mixed with the powder, the slurry is dried in air at a temperature of about 60° C. This produces a dried alloy powder material with small crystals of the lithium compound on the surfaces of the powder particles with a generally uniform distribution. This dried powder is sieved through about a 150 micron screen to break up any cakes formed during drying.

The sieved material is spread and heated to decompose the lithium nitrate or other compound used. For lithium nitrate a temperature of about 700° C. in air for a period of about 15 minutes to maintain the material at the 700° C. temperature for at least 2 minutes is suitable. At this temperature the lithium nitrate decomposes to lithium oxide. The resulting powder material for use in making electrical contacts therefore consists of a silver and completely oxidized cadmium oxide powder with lithium oxide particles dispersed substantially evenly throughout the material over the surfaces of the powder particles.

To add the fourth metal the starting materials of the process are preferably modified. For describing the process tellurium will be used although other suitable metals could be used. To add tellurium, the first starting material would be the same type of silver powder and the second starting material would be a compound or combination with cadmium and tellurium such as a co-precipitated cadmium-tellurium oxide compound powder having a particle size of not greater than approximately 75 microns. The silver and cadmium-tellurium oxide powders are mixed in the same manner as silver and cadmium oxide to provide an evenly dispersed mixture. The mixture is heated in a highly reducing atmosphere to produce a silver-cadmium alloy powder with cadmium-telluride particles dispersed over the surface of the silver-cadmium alloy powder particles. The mixture is sieved and heated to internally oxidize the cadmium and the cadmium-telluride in substantially the same manner as without the tellurium. The mixture is then sieved to provide a powder particle size not greater than about 150 microns.

The cadmium-tellurium powder, or other similar powder compound used as a second starting material, can be produced by any one of several known techniques, for example, powder metallurgical or inert gas or vacuum melting techniques. For the production of an electrical contact material which consists of silver, cadmium oxide and tellurium, the tellurium preferably is added in combination with cadmium in the form of a chemically co-precipitated compound.

A co-precipitated compound of cadmium and tellurium can be obtained from oxides of the metals by a process which includes the steps of: dissolving the required amounts of cadmium oxide and tellurium oxide powders in hot concentrated nitric acid, using the minimum necessary amount of acid; heating the liquor to drive off any excess acid after the oxides have dissolved; precipitating the cadmium-tellurium compound or compounds from the liquor with sodium carbonate solution; washing and filtering the settled, fine, white precipitate; washing the filtered precipitate on the filter bed with distilled water and acetone and then drying it at 60° C. in an air oven; decomposing the precipitate by heating it in a furnace in air for a period of approximately 2 hours at a temperature of approximately 450° C. with the temperature of the furnace being raised to this level in about one hour to produce a fine powder mixture of cadmium oxide and a mixed oxide of cadmium and tellurium in intimate dispersion; rewashing the decomposed precipitate to remove any traces of sodium contamination and drying the washed precipitate at a temperature of approximately 100° C., the colour of the precipitate changing during washing and drying to a pale yellow due to hydration; and refiring the washed decomposed precipitate in air for a period of approximately two hours at a temperature of approximately 450° C. to drive off the water of hydration. The resulting co-precipitated powder, which contains cadmium and tellurium in uniformly distributed oxide forms, is sieved through a 75 micron screen before being used in the production of the silver-cadmium oxide-tellurium contact material.

Commercially available cadmium oxide and tellurium oxide powders having a minimum assay of 99% can be used to produce the co-precipitated compound, a typical commercially available cadmium oxide material being "reagent grade" cadmium oxide powder produced by Hopkins and Williams Limited, of Great Britain.

Thus, to describe this process according to the invention in more detail, a silver-cadmium oxide-tellurium material for making electrical contacts is produced by mixing a first starting material of silver powder in the desired proportions with a second starting material of a co-precipitated cadmium-tellurium powder which may be diluted with cadmium oxide powder is desired. A third metal, such as lithium, in its oxide form may be added at this point but is preferably added after the later oxidation step. The silver powder has a particle size of about not greater than about 40 microns and the cadmium-tellurium powder should have a particle size of not greater than about 75 microns and is sieved through a 40 micron screen.

After sieving, the powder is placed in a suitable vessel to a depth not exceeding 1 centimeter, and is heated to between 200° and 700° C. in an atmosphere of hydrogen with a temperature of about 400° C. preferred to avoid excessive sintering and loss of cadmium due to volatilization. The temperature of 400° C. is maintained for 1 hour with the mixture brought to this temperature at the rate of about 200° C. per hour. The hydrogen reduces the cadmium oxide to cadmium, and any tellurium oxide to tellurium, and the cadmium diffuses into the silver and forms a silver-cadmium alloy powder with very fine cadmium-telluride particles dispersed over the surfaces of the alloy powder particles. At temperatures above 321° C. the cadmium is liquid, and homogenization of the alloy involves liquid phase mechanisms, and below this temperature, as in the final stages of homogenization, solid state diffusion processes are involved. Sintering of the alloy particles also occurs, but is very loose and easily broken down by sieving. The presence of the sub-micron telluride particles greatly facilitates the breaking down of the loosely sintered product into a powder, especially when the tellurium content is greater than about 0.2 weight %. The alloy material is sieved through a 30 micron screen to produce a mixture in the form of small aggregated lumps.

The sieved powder is then heated in an oxidizing atmosphere to effect internal oxidation of the cadmium and the cadmium-telluride, the cadmium being converted to cadmium oxide and the cadmium-telluride to a complex oxide containing cadmium and tellurium. This is accomplished by passing the mixture through a furnace containing any suitable oxidizing atmosphere, for example air or oxygen, at any suitable pressure. The temperature should be between 350° C. and the melting point of the alloy present with a preferred temperature of about 600° C. The time required for oxidation depends on the partial pressure of the oxygen, the cadmium content, the temperature, and the size of the particles. These factors are assessed in any known manner. The internally oxidized alloy powder is then sieved to a degree of fineness suitable for subsequent use in a contact making process or for the addition of the third metal oxide, if it was not added during the mixing step, in the same manner as without the tellurium as described earlier.

The resulting powder material with the lithium oxide, with or without tellurium, is then sieved through a 150 micron screen to produce an alloy powder material suitable for metallurgical techniques to produce electrical contacts.

To produce contacts from the powder material a typical process would be compacting the powder material at a pressure of about 20 to 30 tons per square inch into a desired shape, sintering the compacted material in air at a temperature of about 930° C. for an hour, and then, if desired, increasing the density of the material by subsequently stamping or coining at a pressure of about 45 to 60 tons per square inch.

The contacts made from these materials, particularly when produced by this process, has desirable characteristics. For example, with silver and an 11 weight % cadmium oxide material with lithium oxide present in percentages of lithium 0.1 weight %, 0.05 weight % and 1.5 weight %, it has been found that resistance to welding and erosion were improved in capacitor discharge tests of 65 volts and 950 amperes peak current. This improvement resulted largely because the number of strong welds were greatly reduced and the spread of erosion was better as compared to similar lithium free material.

The materials with tellurium containing 0.25 and 1.50 weight percent of tellurium showed a very significant improvement in resistance to welding in comparison to silver, eleven weight percent cadmium oxide without tellurium, the mean weld strength being about one order of magnitude lower for these two tellurium containing materials than for the tellurium free material. The materials containing 0.05 and 0.01 weight % of tellurium also showed, to a lesser extent, an improvement in resistance to welding in comparison to the tellurium free materials.

With lithium oxide the characteristics of the electrical contacts made material are generally the same as the characteristics of the electrical contacts made from the silver, cadmium oxide, and tellurium material except that the lithium oxide addition greatly improves the spread of erosion as described earlier.

I claim:

1. A process of improving material used in manufacturing electrical contacts for electrical power applications and made with a first starting material selected from a group essentially consisting of a first metal in powder form and reducible compounds of the first metal in powder form both having a selected maximum particle size, and with a second starting material selected from a group essentially consisting of a second metal in powder form, reducible compounds of the second metal in powder form, and mixtures of the second metal in powder form all having a selected maximum particle size with said second metal selected to be more readily oxidizable than the first metal under similar environmental conditions and added in an amount from a minimum effective amount up to the maximum limit of solubility of the second metal in the first metal by mixing the first and second starting materials together to obtain a mixture having a substantially even dispersion of the first and second starting materials; heating the mixture in a reducing atmosphere at a temperature below the melting temperature [of the alloy] of the alloy of the first and second metals in the proportions present to alloy the first and second metals in a powder form; sieving the alloyed mixture to produce a selected maximum particle size; heating the sieved mixture in an oxidizing atmosphere at a temperature and under conditions selected to substantially completely oxidize the second metal and with said temperature below the melting temperature of the alloy of the first and second metals in the proportions present to thereby maintain the mixture in a powder form; and sieving the oxidized mixture to produce a selected maximum particle size, said process comprising:

adding at a selected time during the process *a compound which is convertible to an oxide of a third metal or* an oxide of a third metal selected from a group consisting of the metals in group IA and IIA of a periodic table *to provide a contact material having the oxides of the second and the third metals uniformly distributed throughout the material.*

2. A process according to claim 1 wherein the first metal is selected from a group consisting of silver and copper.

3. A process according to claim 2 wherein the second metal is selected from a group consisting of cadmium, zinc and tin.

4. A process according to claim 1 wherein the first metal is silver, the second metal is cadmium, and the temperature during the heating of the mixture in a reducing atmosphere is between 321° and 700° C. and the temperature during the heating in an oxidizing atmosphere is between 400° and 600° C.

5. A process according to claim [4] *1* wherein the third metal is lithium.

6. A process according to claim 1 wherein the first starting material is the first metal and the second starting material is a compound of the second metal reducible under selected conditions to an uncombined form; and the reducing atmosphere is selected to reduce the second metal compound to an uncombined form.

7. A process according to claim 6 wherein the first metal is silver.

8. A process according to claim 7 wherein the compound of the second metal is cadmium oxide and the temperature during heating to alloy is between 321° and 700° C.

9. A process according to claim 8 wherein the temperature of heating in an oxidizing atmosphere is between 400° and 600° C.

10. A process according to claim 6 wherein the oxide of the third metal is added as a third starting material to the mixture of the first and second starting materials with said third metal selected to be more readily oxidizable than the first and the second metals under similar environmental conditions.

11. A process according to claim 10 wherein the third metal is selected from the group consisting of lithium and barium.

12. A process according to claim 11 wherein the first metal is silver and the second metal is cadmium.

13. A process according to claim 12 wherein the third metal is lithium and the temperature during heating in a reducing atmosphere is between 321° and 700° C. and the temperature for heating to oxidize is between 400° and 600° C.

14. A process according to claim 1 wherein the addition of the third metal comprises adding the third metal to the sieved mixture in a compound solution after sieving the oxidized mixture with said compound selected from a group consisting of those compounds of the selected third metal soluble in a suitable solvent and reducable under selected conditions to the oxide of the third metal, drying the solution, and reducing under the selected conditions at the selected time during said process the dried compound of the third metal to the oxide of the third metal.

15. A process according to claim 14 wherein the third metal is lithium.

16. A process according to claim 15 wherein the first starting material is silver, the second starting material is cadmium oxide, the third metal compound is a compound of lithium soluble in a selected solvent, and said adding of the solution comprises mixing the oxidized mixture and the solution in a slurry having a selected consistency and selected solution strength to obtain a selected proportion of the third metal in the contact material.

17. A process according to claim 16 wherein the compound of the third metal is lithium nitrate.

18. A process according to claim 17 wherein the solvent is propanol, the lithium nitrate is dissolved in the propanol and mixed in the selected proportion in a solution strength producing substantially equal amounts of solution and oxidized mixture.

19. A process according to claim 17 wherein said drying of the compound comprises heating the lithium nitrate solution and oxidized mixture after mixing to evaporate the propanol and dry the mixture and heating the dried mixture at a temperature of 700° C. to reduce the lithium nitrate to lithium oxide.

20. A process according to claim 1 wherein the second starting material is a mixture of the second metal and a fourth metal selected to be insoluble in the first metal with said fourth metal selected to impart embrittlement qualities to the contact material and to be more readily oxidizable than the first metal under similar environmental conditions.

21. A process according to claim 20 wherein the second metal is cadmium and the fourth metal is tellurium and wherein said second starting material is produced by co-precipitation of cadmium and tellurium in a heating process to form an alloy of the oxides of cadmium and tellurium.

22. A process according to claim 21 wherein the first metal is silver and the temperature of heating to alloy is between 321° and 700° C.

23. A process according to claim 20 wherein the addition of the third metal comprises adding to the sieved oxidized mixture the third metal in the form of a compound of the third metal dissolved in a suitable solvent, mixing the dissolved compound in desired proportions with the sieved oxidized mixture, drying the compound, and reducing the compound to the oxide of the third metal at the selected time during the process to thereby add the oxide of the third metal.

24. A process according to claim 23 wherein the third metal is lithium.

25. A process according to claim 24 wherein the fourth metal is tellurium and the second metal is cadmium.

26. A process according to claim 25 wherein the first metal is silver.

[27. A process according to claim 26 wherein said second metal is cadmium and said fourth metal is tellurium.]

[28. A process according to claim 27 wherein the third metal is lithium.]

29. An electrical contact for electrical power level applications comprising a material produced by an improved process using a first starting material of a first metal in an uncombined or combined powder form having a maximum selected particle size and a second starting material of a second metal in an uncombined or combined powder form having a maximum selected particle size with said second metal selected to be more readily oxidizable than the first metal under similar environmental conditions added in an amount up to the maximum limits of solubility of the second metal in the first metal; mixing the first and second starting materials together to obtain a mixture having a substantially even dispersion of the two starting materials; heating the mixture in a reducing atmosphere at a temperature below the melting temperature of the alloy of the two metals in the proportions present to alloy the two metals in a powder form; sieving the alloyed mixture to produce a selected maximum particle size; heating the sieved mixture in an oxidizing atmosphere at a temperature and under conditions selected to substantially completely oxidize the second metal and with said temperature below the melting temperature of the alloy of the two metals in the proportions present to maintain the mixture in a powder form; and sieving the oxidized mixture to produce a powder having a maximum selected particle size, wherein said improved process comprises:

adding at a selected time during the processs *a compound which is convertible to an oxide of a third metal or* an oxide of a third metal selected from a group consisting of the metals in groups IA and IIA of a periodic table *to provide a contact material having the oxides of the second and the third metals uniformly distributed throughout the material.*

30. An electrical contact according to claim 29 wherein the first metal is selected from a group consisting of silver and copper.

31. An electrical contact according to claim 29 wherein the second metal is selected from a group consisting of cadmium, zinc and tin.

32. An electrical contact according to claim 29 wherein the first metal is silver, the second metal is cadmium, and the temperature during the heating of the mixture in a reducing atmosphere is between 321° and 700° C., and the temperature during the heating in an oxidizing atmosphere is between 400° and 600° C.

33. An electrical contact according to claim 32 wherein the third metal is selected from a group consisting of lithium and barium.

34. An electrical contact according to claim 29 wherein the first metal is selected from a group consisting of metals having a relatively high electrical conductivity, and the second metal is selected from a group of metals selected to be insoluble in the first metal and to impart embrittlement qualities to the contact.

35. An electrical contact according to claim 34 wherein the first metal is silver.

36. An electrical contact according to claim 34 wherein the second starting material is cadmium oxide and the temperature during heating to alloy is between 321° and 700° C.

37. An electrical contact according to claim 36 wherein the temperature of heating in an oxidizing atmosphere is between 400° and 600° C.

38. An electrical contact according to claim 34 wherein the oxide of the third metal is added as a third starting material to the mixture of the first and second starting materials with said third metal selected to be more readily oxidizable than the first and the second metals under similar environmental circumstances.

39. An electrical contact according to claim 38 wherein the third metal is selected from a group consisting of lithium and barium.

40. An electrical contact according to claim 39 wherein the first metal is silver and the second metal is cadmium.

41. An electrical contact according to claim 40 wherein the third metal is lithium and the temperature during heating in a reducing atmosphere is between 321° and 700° C. and the temperature of heating to oxidize is between 400° and 600° C.

42. An electrical contact according to claim 29 wherein the addition of the oxide of the third metal comprises adding the third metal in the form of a compound in solution to the sieved mixture after sieving the oxidized mixture with said compound selected from a group consisting of those compounds of the third metal soluble in a selected solvent and reducible under selected conditions to the oxide of the third metal, drying the compound, and reducing the compound under the selected conditions during the process to thereby add the oxide of the third metal.

43. An electrical contact according to claim 42 wherein the third metal is lithium.

44. An electrical contact according to claim 43 wherein the first starting material is silver, the second starting material is cadmium oxide, the compound in solution is a compound of lithium in solution in a selected solvent, and said adding of the solution comprises mixing the oxidized mixture and the solution in a slurry in the desired proportions to obtain a selected amount of the third metal in the material.

45. An electrical contact according to claim 44 wherein the compound of the third metal is lithium nitrate.

46. An electrical contact according to claim 45 wherein the solvent is propanol, and the lithium nitrate is dissolved in the propanol and mixed in the selected proportion in a solution having a strength producing substantially equal amounts of solution and oxidized mixture.

47. An electrical contact according to claim 46 wherein said drying of the solution comprises heating the lithium nitrate solution and oxidized mixture after mixing to evaporate the propanol and dry the mixture, and heating the dried mixture at a temperature of 700° C. to reduce the lithium nitrate to lithium oxide.

48. An electrical contact according to claim 29 wherein the second starting material consists essentially of the second metal combined with a fourth metal selected to be insoluble in the first metal, to impart embrittlement qualities to the contact material, and to be more readily oxidizable than the first metal under similar environmental conditions.

49. An electrical contact according to claim 48 wherein the second metal is cadmium and the fourth metal is tellurium with said second starting material produced by co-precipitation of cadmium and tellurium in a heating process to form an alloy of cadmium and tellurium and their oxides.

50. An electrical contact according to claim 49 wherein the first metal is silver and the temperature of heating to alloy is between 321° and 700° C.

51. An electrical contact according to claim 48 wherein the addition of the third metal comprises adding the third metal to the sieved oxidized mixture in the form of a compound of the third metal dissolved in a suitable solvent, mixing the resulting solution in desired proportions with the sieved oxidized mixture, drying the resulting solution, and heating the desired mixture under conditions selected to reduce the compound to the oxide of the third metal.

52. An electrical contact according to claim 51 wherein the third metal is lithium.

53. An electrical contact according to claim 52 wherein the fourth metal is tellurium and the second metal is cadmium.

54. An electrical contact according to claim 53 wherein the first metal is silver.

55. An electrical contact according to claim 51 wherein said second metal is cadmium and said fourth metal is tellurium.

56. An electrical contact according to claim 55 wherein the third metal is lithium.

57. An electrical contact according to claim 56 wherein the first metal is silver.

*58. A process of improving material used in manufacturing electrical contacts for electrical power applications and made with a first starting material selected from a group essentially consisting of a first metal in powder form and reducible compounds of the first metal in powder form both having a selected maximum particle size, and with a second starting material selected from a group essentially consisting of a second metal in powder form, reducible compounds of the second metal in powder form, and mixtures of the second metal in powder form all having a selected maximum particle size with said second metal selected to be more readily oxidizable than the first metal under similar environmental conditions and added in an amount from a minimum effective amount up to the maximum limit of solubility of the second metal in the first metal by mixing the first and second starting materials together to obtain a mixture having a substantially even dispersion of the first and second starting materials; heating the mixture in a reducing atmosphere at a temperature below the melting temperature of the alloy of the first and second metals in the proportions present to alloy the first and second metals in a powder form; sieving the alloyed mixture to produce a selected maximum particle size; heating the sieved mixture in an oxidizing atmosphere at a temperature and under conditions selected to substantially completely oxidize the second metal and with said temperature below the melting temperature of the alloy of the first and second metals in the proportions present to thereby maintain the mixture in a powder form; and sieving the oxidized mixture to produce a selected maximum particle size, said process comprising:*

*adding by precipitation at a selected time during the process a compound which is convertible to an oxide of a third metal or an oxide of a third metal selected from a group consisting of the metals in group IA and IIA of a periodic table to provide a contact material having the oxides of the second and the third metals uniformly distributed through out the material.*

*59. A process according to claim 58 wherein the first metal is selected from a group consisting of silver and copper.*

*60. A process according to claim 59 wherein the second metal is selected from a group consisting of cadmium, zinc and tin.*

*61. An electrical contact according to claim 60 wherein the third metal is selected from a group consisting of lithium and barium.*

* * * * *